United States Patent
Alfano et al.

(10) Patent No.: US 9,664,105 B2
(45) Date of Patent: May 30, 2017

(54) SYSTEM FOR DRIVING AT LEAST ONE COMPRESSOR, NOTABLY A COMBUSTION ENGINE SUPERCHARGER COMPRESSOR

(71) Applicant: Valeo Systemes de Controle Moteur, Cergy Saint Christophe (FR)

(72) Inventors: Damien Alfano, Le Pecq (FR); Jean-Louis Lagre, Cergy (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 108 days.

(21) Appl. No.: 14/420,786

(22) PCT Filed: Aug. 1, 2013

(86) PCT No.: PCT/FR2013/051866
§ 371 (c)(1),
(2) Date: Feb. 10, 2015

(87) PCT Pub. No.: WO2014/027156
PCT Pub. Date: Feb. 20, 2014

(65) Prior Publication Data
US 2015/0233284 A1    Aug. 20, 2015

(30) Foreign Application Priority Data
Aug. 13, 2012   (FR) ...................................... 12 57788

(51) Int. Cl.
*F02B 33/44*    (2006.01)
*F02B 33/00*    (2006.01)
(Continued)

(52) U.S. Cl.
CPC .............. *F02B 39/04* (2013.01); *F02B 39/12* (2013.01); *F04D 25/028* (2013.01)

(58) Field of Classification Search
CPC .................................. F02B 39/04; F02B 39/12
(Continued)

(56) References Cited

U.S. PATENT DOCUMENTS 2,390,626 A * 12/1945 Szekely .................. F02B 33/00
123/561
2,585,029 A *  2/1952 Nettel ..................... F02B 37/11
192/3.57

(Continued)

FOREIGN PATENT DOCUMENTS

DE    10 2004 018 420 A1    11/2005
WO        2008/024895 A1     2/2008
(Continued)

OTHER PUBLICATIONS

International Search Report for corresponding International Application No. PCT/FR2013/051866, mailed Nov. 25, 2013 (2 pages).

*Primary Examiner* — Thai Ba Trieu
(74) *Attorney, Agent, or Firm* — Osha Liang LLP (57) ABSTRACT

System for driving at least one compressor that includes an input able to be connected to a belt secured to a rotary machine, an output able to be connected to the compressor, an epicyclic gear train the annulus gear of which forms a flywheel and the sun gear of which is connected to the output of the system, and a device allowing the configuration of the epicyclic gear train to be modified so that this gear train selectively adopts at least the following configurations: (i) a configuration in which the epicyclic gear train is coupled to the input of the system, (ii) a configuration in which the epicyclic gear train has no internal degree of freedom and in which the epicyclic gear train is uncoupled from the input of the system.

15 Claims, 4 Drawing Sheets

(51) Int. Cl.
 *F16H 3/44* (2006.01)
 *F02B 39/04* (2006.01)
 *F02B 39/12* (2006.01)
 *F04D 25/02* (2006.01)

(58) Field of Classification Search
 USPC ............ 60/607–608; 123/559.1–559.3, 561;
 475/317, 318, 287; 74/411
 See application file for complete search history.

(56) References Cited

U.S. PATENT DOCUMENTS

| | | | | |
|---|---|---|---|---|
| 2,929,198 | A * | 3/1960 | Crocchi | B60K 5/00 60/608 |
| 3,007,302 | A * | 11/1961 | Vincent | F02B 41/10 60/607 |
| 3,307,426 | A * | 3/1967 | Whitaker | F02C 7/277 475/2 |
| 4,610,182 | A * | 9/1986 | Heidrich | F04D 13/028 74/411 |
| 4,989,410 | A * | 2/1991 | Smith | F02B 39/12 60/607 |
| 5,012,906 | A * | 5/1991 | Meyer | F16D 43/284 60/608 |
| 5,890,468 | A * | 4/1999 | Ozawa | F02B 39/04 123/561 |
| 6,845,832 | B2 * | 1/2005 | Takizawa | B60K 6/365 475/287 |
| 7,000,601 | B2 * | 2/2006 | Yasui | F02B 39/04 123/559.3 |
| 8,196,686 | B2 * | 6/2012 | Grieve | B60K 6/365 180/65.235 |
| 8,672,802 | B2 * | 3/2014 | Hwang | F16F 15/13157 475/347 |
| 8,701,636 | B2 * | 4/2014 | Jensen | F02B 39/04 60/608 |
| 8,795,133 | B2 * | 8/2014 | Nackers | B60W 10/103 477/68 |
| 2007/0137626 | A1 * | 6/2007 | Turner | F02B 33/34 123/559.1 |
| 2008/0194375 | A1 * | 8/2008 | Voigt | F16H 3/54 475/296 |
| 2012/0329593 | A1 * | 12/2012 | Larrabee | B64C 39/024 475/5 |

FOREIGN PATENT DOCUMENTS

| | | |
|---|---|---|
| WO | 2008/135722 A1 | 11/2008 |
| WO | 2009/014488 A2 | 1/2009 |

* cited by examiner

SYSTEM FOR DRIVING AT LEAST ONE COMPRESSOR, NOTABLY A COMBUSTION ENGINE SUPERCHARGER COMPRESSOR

The present invention relates to a system for driving a compressor. The compressor is notably, although not exclusively, a combustion engine supercharger compressor.

BACKGROUND

When the torque setpoint of the engine varies sharply and the supercharging of the engine aimed at assisting it in meeting the torque setpoint is obtained only using a turbocharger, the response time of the latter, also referred to as "turbo lag" presents problems.

There are various known solutions for overcoming these problems, for example the use of a number of selectively active turbochargers, the use of an electric compressor or even the use of a centrifugal mechanical compressor.

None of these solutions is truly satisfactory in terms of cost, the space taken up, the effectiveness and breadth of the operating range.

Elsewhere, applications WO 2009/014488 and WO 2008/135722 disclose turbocharger compressor drive systems comprising an epicyclic geartrain. In none of these systems does the annulus gear of the geartrain form a flywheel.

There is still a need to have a compressor drive system that allows the compressor to respond rapidly to a variation in torque setpoint, notably in order to provide a satisfactory answer to the problem of turbocharger response time, while at the same time being relatively inexpensive, being efficient, occupying little space, and being usable over an extended range of speeds of the rotary machine.

SUMMARY OF THE INVENTION

It is an object of the invention to meet this need and the invention achieves this, according to one of the aspects thereof, using a system for driving at least one compressor, comprising:
- an input able to be connected to a belt secured to a rotary machine,
- an output able to be connected to the compressor,
- an epicyclic geartrain, the annulus gear of which forms a flywheel, and the sun gear of which is notably connected to the output of the system, and
- a device allowing the configuration of the epicyclic geartrain to be modified so that the latter selectively adopts at least the following configurations:
    (i) a configuration in which the epicyclic geartrain is coupled to the input of the system,
    (ii) a configuration in which the epicyclic geartrain has no internal degree of freedom and in which the epicyclic geartrain is uncoupled from the input of the system.

When the internal degrees of freedom of the epicyclic geartrain are eliminated, the geartrain rotates as a single entity.

The device allows the epicyclic geartrain to alternate at least between configurations (i) and (ii) above.

The invention allows the annulus gear of the epicyclic geartrain, which acts as a flywheel, to be used as a buffer store of energy. Coupling the epicyclic geartrain to the input of the system allows the annulus gear to be driven by the belt and the rotary machine and allows it to become charged with kinetic energy.

Eliminating the internal degrees of freedom of the epicyclic geartrain allows all or some of the kinetic energy of the annulus gear to be transmitted to the sun gear so as to drive the compressor, drawing little or no torque from the rotary machine.

The system may make it possible to obtain a variable reduction ratio between the rotary machine and the compressor over time, by virtue of the way in which the speed of the annulus gear evolves. The system notably makes it possible to increase the reduction ratio provided by the system when the speed of the rotary machine increases during a transient phase following on from an increase in torque setpoint of this rotary machine.

The epicyclic geartrain may be a geartrain of type 1, formed by the annulus gear, the sun gear, one or more planet pinions and the planet carrier. The sun gear and the annulus gear are preferably concentric.

The annulus gear being connected to nothing other than to the planet pinion(s) with which it meshes, so as to form the flywheel. The annulus gear is thus free to rotate.

In configuration (i), the coupling of the epicyclic geartrain to the input of the system may be performed by a coupling between the planet carrier of the epicyclic geartrain and the input of the system. In this configuration (i), the sun gear may be able to move with respect to the annulus gear.

The device may comprise:
- a first coupling member arranged in such a way as to selectively eliminate any internal degree of freedom of the epicyclic geartrain, and
- a second coupling member arranged in such a way as to selectively couple the epicyclic geartrain and the input of the system, notably being interposed between the planet carrier and the input of the system.

The first coupling member then allows the sun gear and the annulus gear to be locked together.

The first coupling member is, for example, interposed between the planet carrier and the annulus gear of the epicyclic geartrain.

As an alternative, the first coupling member is interposed between the planet carrier and the sun gear of the epicyclic geartrain.

More generally, the first coupling member is interposed between two elements of the epicyclic geartrain, these two elements being selected from: the sun gear, the annulus gear, the planet pinion(s) and the planet carrier, and the first coupling member allows these two elements to be coupled selectively.

In configuration (i), the planet carrier may be coupled to the input of the system while at the same time being free to move with respect to the sun gear, this notably allowing the annulus gear to be driven by the rotary machine in order to increase the kinetic energy of this annulus gear.

In configuration (ii), the sun gear may be locked to the annulus gear without the planet carrier being coupled to the input of the system, and this allows the annulus gear to give up all or some of its kinetic energy to the compressor in order to drive the latter without drawing torque from the rotary machine.

The ratio between the output speed and the input speed of the system may vary by a factor at least equal to two.

Of the first and second coupling members at least one may be a clutch. In one exemplary embodiment of the invention, the first coupling member is a clutch and the second coupling member is another clutch.

As an alternative, the first and/or the second coupling member may for example be a dog clutch.

When the output of the system is connected to the compressor, a reduction gear may be interposed between this output and this compressor. This reduction gear for example has a reduction ratio of between ten and twenty, being for example of the order of fifteen.

The ratio between the inertia of the annulus gear and the inertia of the sun gear may be greater than or equal to ten, notably being greater than twenty. Such a choice of value means that the annulus gear can store a satisfactory amount of kinetic energy and also, when the first coupling member is in the coupled position without the second coupling member being so also, allows the speed of the compressor to increase far more quickly than that of the annulus gear, thus when the compressor is a combustion engine supercharger compressor encouraging supercharging and thus encouraging an increase in combustion engine torque.

The system may comprise a brake configured to be applied selectively to the annulus gear of the epicyclic geartrain. When the speed of the rotary machine is insufficient to respond satisfactorily to the variation in torque setpoint, applying the brake to the annulus gear means that all the torque drawn from the rotary machine is used to drive the compressor. When the brake is applied to the annulus gear, the system imposes a constant reduction ratio between the input and output thereof.

A further subject of the invention, in another aspect thereof, is a method for driving at least one compressor using the system as defined hereinabove, the input of the system being connected to a belt secured to a rotary machine and the output of the system being connected to the compressor, in which method the configuration of the epicyclic geartrain is modified in such a way that the latter selectively adopts at least the following configurations for driving the compressor:

(i) a configuration in which the epicyclic geartrain is coupled to the input of the system,
(ii) a configuration in which the epicyclic geartrain has no internal degree of freedom and is uncoupled from the input of the system.

As mentioned previously, the flywheel formed by the annulus gear can be charged with or discharged of kinetic energy according to which of these configurations is current.

Configuration (i) can be obtained by coupling the planet carrier to the input of the system. In this configuration (i) the sun gear may be able to move with respect to the annulus gear.

Configuration (ii) may be obtained by coupling the planet carrier to the sun gear.

The method thus makes it possible to impose a variable ratio between the speed of the compressor and the speed of the rotary machine to suit the circumstances. The drive system can thus be used over a broader range.

When the speed of the annulus gear is less than a predefined value, the planet carrier may be coupled to the input of the system so as to increase the kinetic energy of the annulus gear. In this case, the annulus gear may be able to move with respect to the sun gear. This configuration of the epicyclic geartrain then makes it possible, by drawing torque from the rotary machine, to drive the compressor while at the same time charging the annulus gear with kinetic energy.

When the speed of the annulus gear is greater than a threshold value which is, for example, equal to the above predefined value, any internal degree of freedom in the epicyclic geartrain can be eliminated while at the same time uncoupling the epicyclic geartrain from the input of the system so that all or some of the kinetic energy of the annulus gear is transferred to the compressor. The compressor is thus driven without drawing torque from the rotary machine.

The threshold value and/or the predefined value may be reached when the speed of the sun gear is equal to the speed of the annulus gear. In other words, in one exemplary embodiment of the method:

as long as the speed of the annulus gear is less than the speed of the sun gear, the planet carrier is coupled to the input of the system and the annulus gear 1 is able to move with respect to the sun gear, and from the moment the speed of the annulus gear becomes equal to or greater than the speed of the sun gear, the annulus gear is locked to the sun gear without the planet carrier being coupled to the input of the system.

When the rotary machine brakes, the planet carrier may be coupled to the input of the system, so as to increase the kinetic energy of the annulus gear. Energy which would otherwise have been dissipated is thus recuperated.

When the speed of the rotary machine is less than a given value, a brake may be applied to the annulus gear. The annulus gear is, for example, immobilized such that all the torque drawn by the system from the rotary machine is used in real time to drive the compressor without charging the annulus gear with kinetic energy. During this braking action, the planet carrier may be coupled to the input of the system. Still during this braking action, the ratio between the output speed of the system and the input speed of the system is constant.

Later, the brake may be released so as to allow the annulus gear to become charged with kinetic energy and then, once the threshold value has been reached, the configuration of the epicyclic geartrain can be modified so as to transfer all or some of the kinetic energy of the annulus gear to the compressor.

The method may be implemented during a transient phase following an increase in the torque setpoint of the rotary machine.

The rotary machine may be a combustion engine and the compressor may be a supercharger compressor placed in the intake circuit of the combustion engine. In that case, the given value of combustion engine speed that governs the application of the brake to the annulus gear may be 1500 rpm.

The compressor can be used to supplement a turbocharger and driving the compressor off the annulus gear without drawing torque from the combustion engine may make it possible both to increase the intake pressure of the engine while at the same time ensuring that the turbocharger spins up to speed.

Once the engine intake pressure, which means the pressure in the intake manifold, is equal to the pressure that allows the engine to reach the torque setpoint, in order to prevent this pressure value being exceeded as a result of the turbocharger spinning up to speed and as a result of the pressure supplied by the compressor still driven by the annulus gear, a valve of the wastegate type in the combustion engine exhaust circuit can be operated in order to regulate the pressure on the intake side of the engine to the value corresponding to the torque setpoint and to regulate the engine exhaust back-pressures. Engine efficiency could thus be improved.

In instances in which a brake is applied to the annulus gear because the speed of the combustion engine when the increase in torque setpoint occurs is too low, this application of the brake may cease when the pressure on the intake side of the combustion engine reaches a value that allows the combustion engine to meet the torque setpoint.

All or some of the features mentioned hereinabove in relation to the drive system may apply to the above method.

BRIEF DESCRIPTION OF THE DRAWINGS

The invention may be better understood from reading the following description of a nonlimiting exemplary embodiment thereof and from studying the attached drawing in which.

DETAILED DESCRIPTION

Figure 1:
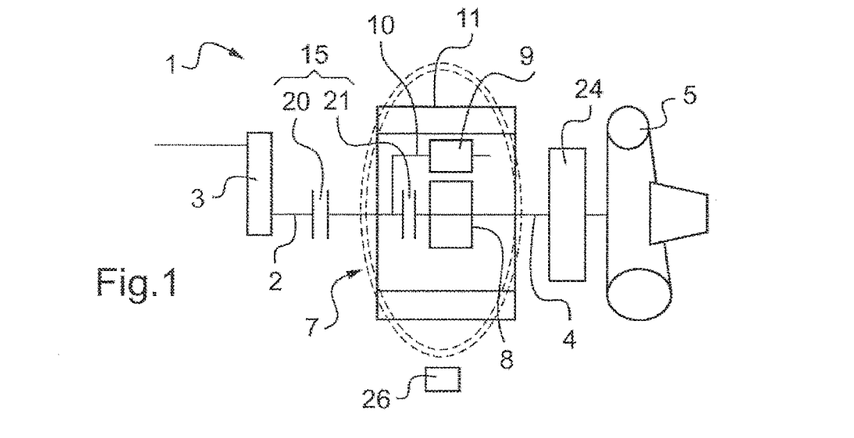
FIG. 1 schematically depicts an example of an environment in which a drive system according to one embodiment of the invention can be used
Figure 2:
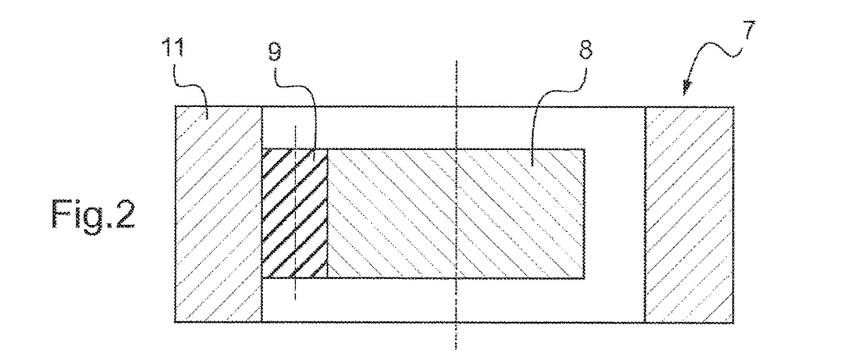
FIG. 2 depicts the epicyclic geartrain of the system of FIG. 1 in detail.

FIG. 1 depicts a drive system 1 according to one exemplary embodiment of the invention.

The system 1 has an input 2 which in this example is connected to a belt 3 secured to a rotary machine that has not been depicted. The belt may have a reduction ratio of between one and three, for example of two. In the example considered, the rotary machine is a motor vehicle combustion engine. The combustion engine runs for example on gasoline or diesel oil as fuel.

The system 1 has an output 4 which is indirectly connected to a compressor 5. In the example considered, the compressor 5 is a compressor for supercharging the combustion engine. It is notably, although nonlimitingly, a centrifugal compressor.

As depicted in FIG. 1, the system 1 also comprises an epicyclic geartrain 7. In the example considered, the geartrain 7 is of type one and comprises a sun gear 8, planets 9, a planet carrier 10 and an annulus gear 11.

In the example considered, the sun gear 8 is connected to the output 4 of the system whereas the planet carrier 10 is indirectly connected to the input 2 of the system. The annulus gear 11 is free, forming a flywheel.

The ratio between the inertia of the annulus gear 11 and that of the sun gear 8 is, in the example considered, greater than ten, or even than twenty.

As may be seen, the system 1 further comprises a device 15 allowing the configuration of the epicyclic geartrain 7 to be modified. This device 15 in the example described takes the form of two coupling members 20 and 21 which are notably clutches.

In the example considered, the second coupling member 20 is interposed between the input 2 of the system 1 and the planet carrier 10 and allows the input 2 to be coupled selectively to the planet carrier 10. The first coupling member 21 in the example considered is interposed between the planet carrier 10 and the sun gear 8 and allows the planet carrier 10 and the sun gear 8 to be coupled selectively so as to eliminate any internal degree of freedom in the epicyclic geartrain 7.

The device 15 may further comprise a control unit, not depicted, for controlling the coupling members 20 and 21. The device 15 is, for example, configured so that the epicyclic geartrain 7 can adopt at least the following two configurations:

(i) the planet carrier 10 is coupled to the input of the system 2 by the second coupling member 20 without being coupled to the sun gear 8 by the first coupling member 21, (ii) the planet carrier 10 is coupled to the sun gear by the first coupling member 21 without being coupled to the input of the system 2 by the second coupling member 20.

As depicted in FIG. 1, an additional reduction gear 24 may be arranged between the output 4 of the system 1 and the compressor 5.

When the epicyclic geartrain 7 is in configuration (i), the ratio between the output speed of the system 1 and the input speed 2 of the system 1 varies for example between one and three whereas when the epicyclic geartrain 7 is in configuration (ii), the entire epicyclic geartrain 7 rotates at the same speed. The system 1 may also comprise a brake 26, depicted very schematically in FIG. 1, able to press against the annulus gear 11 as will be seen later on.

In the application that will now be described, the rotary machine is a motor vehicle combustion engine. The engine comprises an intake circuit and an exhaust circuit and the compressor 5 is a supercharger compressor arranged in the intake circuit of the engine to supplement the turbocharger.

The exhaust circuit further comprises, in the application described, a valve known as a wastegate which, depending on its position, allows all or some of the exhaust gases to bypass the turbine of the turbocharger.

The way in which the compressor 5 is driven using the system 1 will now be described in various situations.

Figure 3:
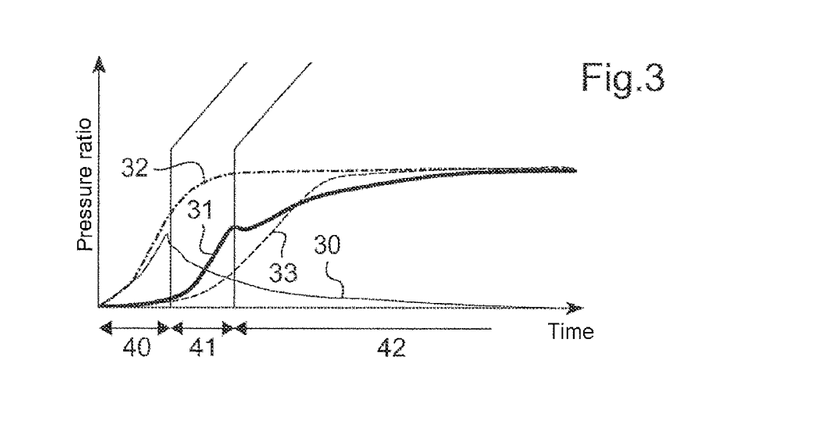
FIGS. 3 to 12 depict various diagrams relating to examples of the use of the system of FIG. 1 for driving a vehicle combustion engine supercharger compressor.
Figure 4:
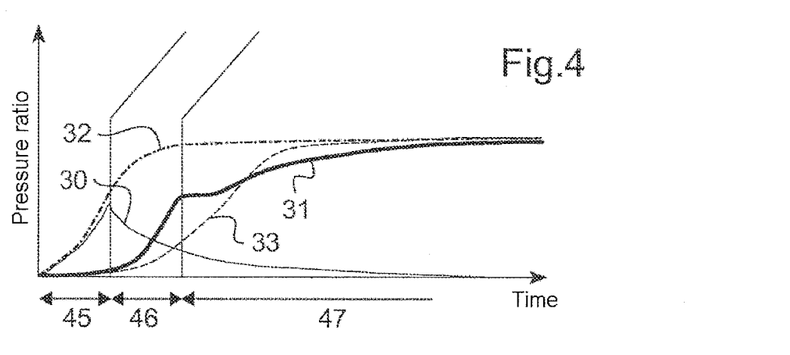
Figure 5:
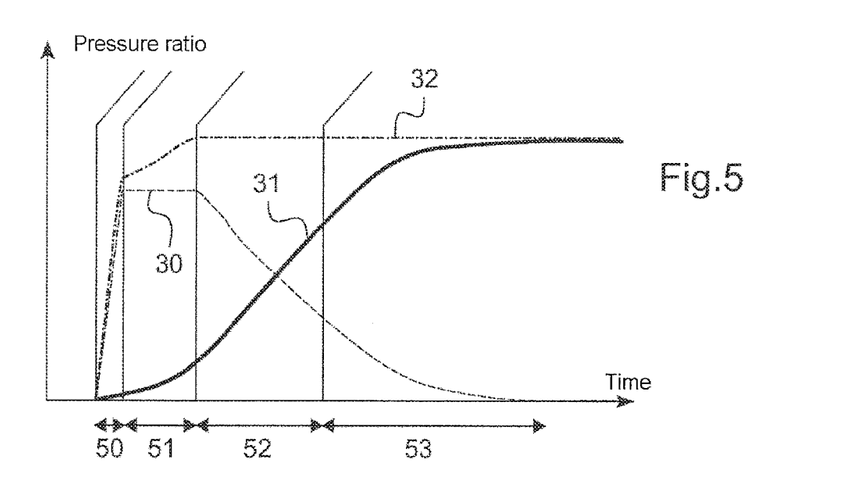

FIGS. 3 to 5 relate to the use of the system 1 to drive the compressor 5 following an increase in combustion engine torque setpoint in three different situations. In FIGS. 3 to 5, the curve 30 represents the pressure ratio of the compressor, i.e. the quotient between the output pressure and the input pressure of the compressor 5, curve 31 represents the pressure ratio of the turbocharger, curve 32 represents the total pressure ratio, i.e. the product of the pressure ratio of the compressor 5 and of the turbocharger, and curve 33 represents the pressure ratio that would be obtained in the absence of the compressor 5 and of the system 1.

In the case of FIG. 3, the speed of the annulus gear 11 is initially insufficient to allow the latter to drive the compressor 5 without drawing torque from the combustion engine.

The device 15 is operated in such a way that the epicyclic geartrain 7 is in configuration (i) above, i.e. such that the planet carrier 10 is coupled to the input 2 of the system 1 without being coupled to the sun gear 8. This configuration (i) is adopted for a phase 40 indicated in FIG. 3.

During this phase 40, the belt 3 drives the planet carrier 10, the movement of which is transmitted to the planet pinions 9, and because the latter mesh with the sun gear 8 and the annulus gear 11, the speed of the compressor 5 and the speed of the annulus gear 11 increase. As indicated in FIG. 3, because of the turbocharger response time, during this phase the increase in pressure in the intake circuit is almost exclusively caused by the compressor 5. Because of the high inertia of the annulus gear 11, the speed thereof increases less rapidly than the speed of the compressor 5, this increase in speed of the annulus gear 11 leading to a reduction in the ratio between the speed of the sun gear 8 and that of the planet carrier 10, i.e. between the output speed of the system 1 and the input speed of the system 1. Because the annulus gear 11 is free to rotate, its speed increases gradually during this phase 40 and the annulus gear 11 may then become charged with kinetic energy thanks to the torque drawn from the combustion engine.

When the speed of the annulus gear 11 becomes equal to that of the sun gear 8, the device 15 is operated in such a way that the epicyclic geartrain 7 switches from configuration (i) to configuration (ii) in which the planet carrier 10 is coupled to the sun gear 8 without being coupled to the input 2 of the system 1. In this configuration, the epicyclic geartrain 7 rotates as a single entity.

The switch to this configuration (ii) corresponds to the start of a phase 41. During this phase 41, no torque is drawn from the combustion engine and the compressor 5 is driven by the transfer, from the annulus gear 11 to the compressor 5, of all or some of the kinetic energy stored in the annulus gear 11 during phase 40.

As indicated in FIG. 3, during this phase 41, the turbocharger increases in speed, this increase in speed being notably promoted by the fact that the compressor 5 has allowed a more rapid rise in boost pressure and therefore an increase in the energy of the exhaust gases that drive the turbine of the turbocharger. Phase 41 ends when the pressure on the intake side of the engine reaches the value that allows the engine to meet the torque setpoint. As indicated in FIG. 3, when this pressure value is reached, kinetic energy may still be present in the annulus gear 11, which means that the latter will continue to drive the compressor 5. In order to prevent the pressure on the intake side from becoming too high as a result of the combined action of the compressor 5 and of the turbocharger, the wastegate valve of the exhaust circuit is operated in phase 42 which follows on from phase 41 in order to regulate the intake pressure value to the value that is being sought and to limit exhaust back-pressures.

Another scenario in the use of the system 1 for driving the compressor 5 following an increase in the combustion engine torque setpoint will now be described with reference to FIG. 4. In this case, kinetic energy has been stored up beforehand in the annulus gear.

A braking phase precedes for example the increase in the torque setpoint and, during this braking phase, the device 15 is operated in such a way that the epicyclic geartrain 7 is in configuration (i). During this braking phase, the belt 3 drives the planet carrier 10, the movement of which is transmitted to the planet pinions 9 and because the latter are in mesh with the sun gear 8 and the annulus gear 11, the speed of the compressor 5 and the speed of the annulus gear 11 increase. Kinetic energy is thus stored up in the annulus gear 11. Because of the braking of the combustion engine, a butterfly valve in the engine intake circuit downstream of the compressor can close, so that the compressor 5 supplies a resistive torque increasing the speed of the annulus gear 11 and therefore the amount of kinetic energy stored therein.

When the increase in torque setpoint occurs thereafter, the device 15 can be operated in such a way that the epicyclic geartrain switches into configuration (ii). The way in which the compressor 5 behaves will then be described with reference to FIG. 4.

A first phase 45 corresponds to the closing of the first coupling member 21. As depicted, during this phase 45, the pressure on the intake side of the engine is almost exclusively supplied by the compressor 5.

The phase 45 ends when the geartrain 7 is in configuration (ii) and phases 46 and 47 which are similar to those described with reference to FIG. 3 can then occur in succession.

Another scenario of the use of the system 1 for driving the compressor 5 following an increase in engine torque setpoint will now be described with reference to FIG. 5. In this case, at the time of this increase in torque setpoint, combustion engine speed is low, for example below 1500 rpm.

Because of this low combustion engine speed it is not desirable to draw torque from the engine in order to drive the compressor and charge the annulus gear 11 with kinetic energy. As a result, following this increase in combustion engine torque setpoint, the brake 26 is applied to the annulus gear 11 so as to immobilize the latter. In FIG. 5, phase 50 corresponds to the action of the device 15 so that the epicyclic geartrain adopts configuration (i) whereas the brake 26 is already applied to the annulus gear 11. During this phase 50, the total pressure ratio, from which the pressure on the intake side of the engine can be deduced, increases greatly, being almost identical to the pressure ratio of the compressor 5.

Phase 51 follows on from phase 50 when the geartrain 7 is in configuration (i). During this phase 51, the compressor 5 operates at constant speed, as can be seen in FIG. 5. The constant value of the ratio between the output speed of the system 1 and the input speed of the system 1 during this phase 51 is for example strictly greater than 2, notably being comprised between 2.5 and 3.5.

Phase 51 is over when the pressure on the intake side of the combustion engine adopts a value that allows the combustion engine to meet the torque setpoint. The brake 26 is then released so that during a later phase 52, the annulus gear 11 can start to rotate and store up kinetic energy whereas the turbocharger quickly increases in pressure. During phase 52, the ratio between the output speed of the system 1 and the input speed of the system 1 decreases from the value it had at the end of phase 51 down to unity.

This phase 52 is over when the annulus gear 11 and the sun gear 8 have the same speed. The device 15 is then operated in such a way that the epicyclic geartrain 7 adopts configuration (ii) in which the drive of the compressor 5 is performed using the kinetic energy previously stored in the annulus gear 11, without drawing torque from the combustion engine. If appropriate, this phase 52 may be followed by a later phase similar to phases 42 or 47 described with reference to FIGS. 3 and 4.

Figure 6:
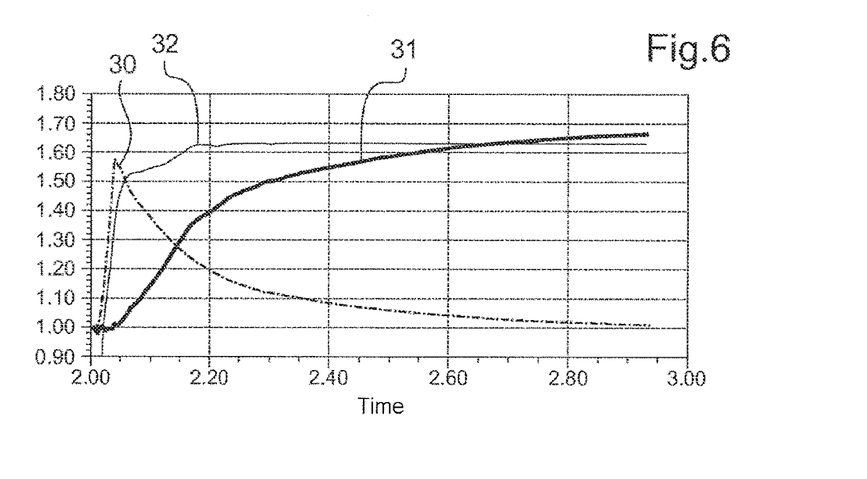
Figure 7:
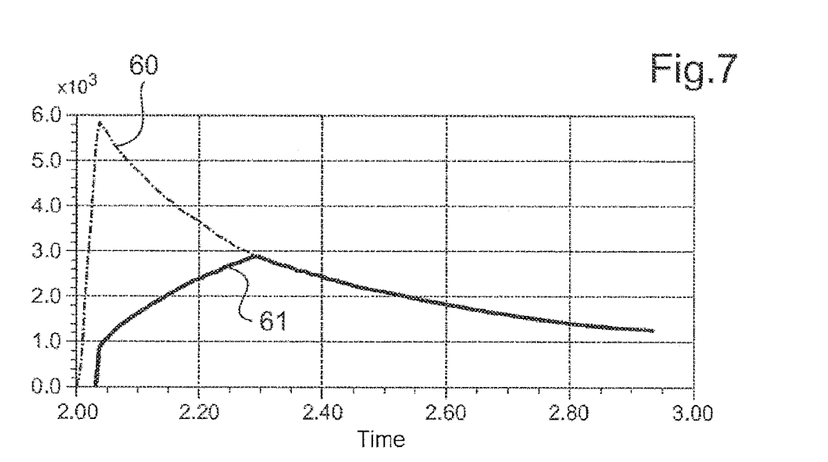

FIGS. 6 and 7 correspond to the scenario which has just been described with reference to FIG. 3, FIGS. 8 to 10 correspond to the scenario which has just been described with reference to FIG. 4, and FIGS. 11 and 12 correspond to the scenario which has just been described with reference to FIG. 5, for the same relative dimensioning of the epicyclic geartrain 7 and with a direct-injection turbocharged 1.2 l gasoline engine.

Figure 8:
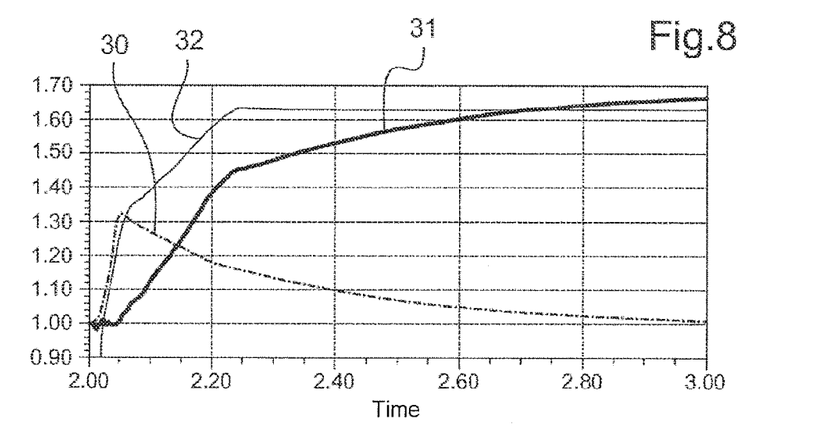
Figure 9:
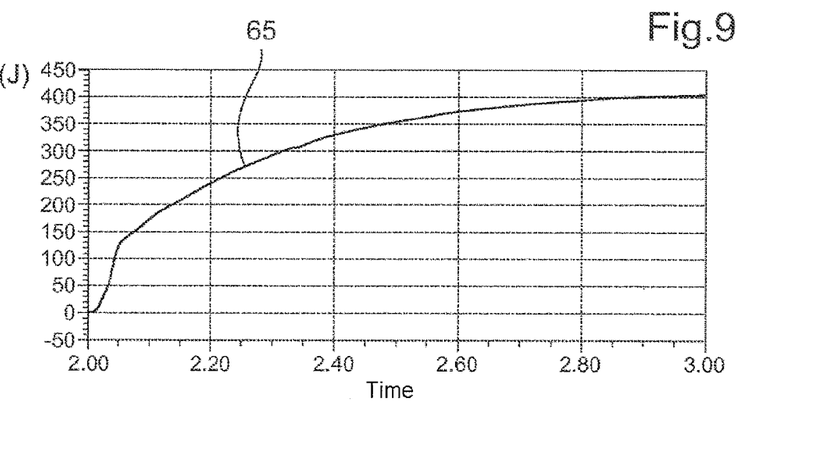
Figure 10:
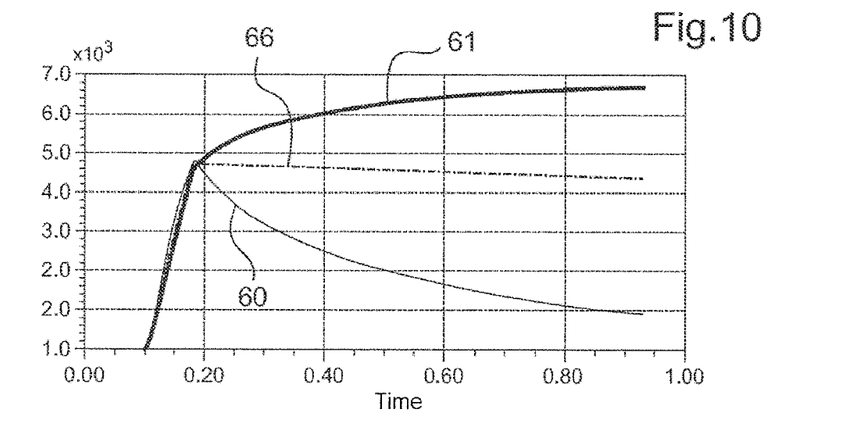
Figure 11:
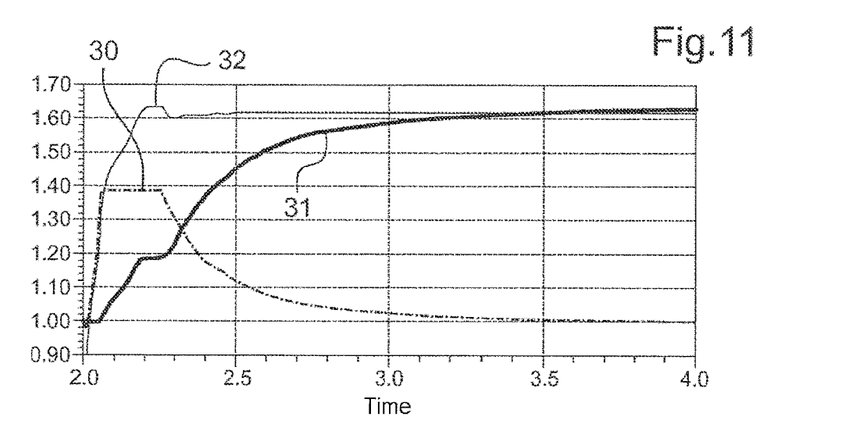
Figure 12:
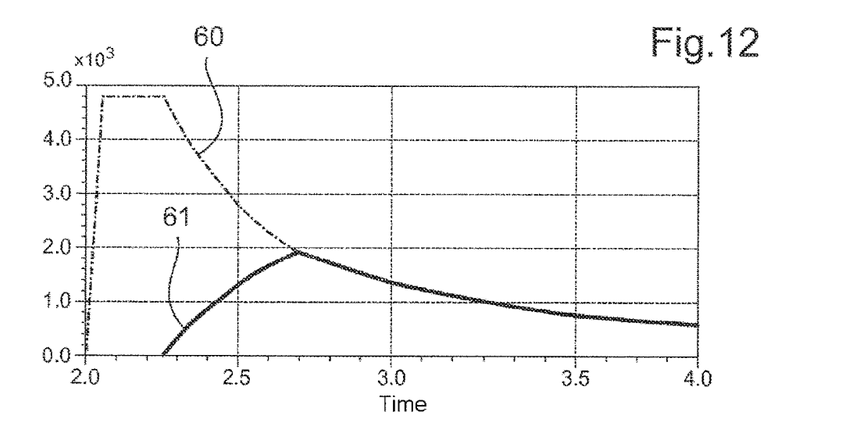

More specifically:

FIGS. 6 and 7 correspond to the scenario in which the speed of the combustion engine is stable around 1800 rpm, in which the annulus gear 11 is not precharged with kinetic energy, and in which the throttle pedal is depressed fully at the "two seconds" mark, FIGS. 8 to 10 correspond to the scenario in which the speed of the combustion engine is stable around 1800 rpm, in which the annulus gear 11 is precharged with kinetic energy, and in which the throttle pedal is fully depressed at the "two-seconds" mark, FIG. 9 indicating the kinetic energy charge of the annulus gear 11 when braking occurs, the speed of the combustion engine dropping in five seconds from 3000 rpm to 1500 rpm during this braking, FIGS. 11 and 12 correspond to the scenario in which the speed of the combustion engine is stable around 1200 rpm and the throttle pedal is fully depressed at the "two seconds" mark.

The epicyclic geartrain 7 in the scenario of FIGS. 6 to 12 has the following dimensions:

the sun gear 8 has a zero internal radius, an external radius of 3 cm, a height measured along its axis of rotation of 3 cm, a mass of 0.64 kg, a volume of 0.08 l, a specific density of 7.60 kg/l and an inertia of $2.9 \times 10^{-4}$ kg/m$^2$, the annulus gear 11 has an internal radius of 4.5 cm, an external radius of 6.5 cm, a height measured along its axis of rotation of 5 cm, a mass of 2.63 kg, a volume of 0.35 l, a specific density of 7.60 kg/l and an inertia of $2.8 \times 10^{-3}$ kg/m$^2$, the planet pinion 9 has an internal radius of 0 cm, an external radius of 0.75 cm, a height measured along its axis of rotation of 3 cm, a mass of 0.04 kg, a volume of 0.01 l, a specific density of 7.60 kg/l and an inertia of $1.13 \times 10^{-6}$ kg/m$^2$.

In FIGS. 7 and 12, curve 60 corresponds to the speed of the sun gear 8, while curve 61 corresponds to the speed of the annulus gear 11 in rpm. In FIG. 9, curve 65 corresponds to the mechanical energy of the compressor 5.

In FIG. 10, curve 66 corresponds to the speed of the planet carrier 10.

The invention is not restricted to the examples which have just been described.

In particular, the compressor may be other than a centrifugal compressor, for example may be what is referred to as a roots compressor or a scroll compressor.

Furthermore, there are other positions that the first coupling member 21 may occupy, provided that these positions allow it selectively to eliminate any degree of freedom in the epicyclic geartrain 7.

The expression "comprising a/an/one" is to be understood as synonymous with the expression "comprising at least a/an/one" unless specified to the contrary.

The invention claimed is:

1. A system for driving at least one compressor, comprising:
    an input shaft able to be connected to a belt secured to a rotary machine;
    an output shaft able to be connected to the at least one compressor;
    an epicyclic geartrain, an annulus gear of which forms a flywheel, said annulus gear being connected to at least one planet pinion with which said annulus gear meshes, and a sun gear of which is connected to the output shaft of the system; and
    a clutch device further comprising a first coupling member and a second coupling member, and allowing a configuration of the epicyclic geartrain to be modified between a first configuration and a second configuration, wherein
        in the first configuration, the epicyclic geartrain is coupled to the input shaft of the system, and
        in the second configuration, the epicyclic geartrain has no internal degree of freedom while being simultaneously uncoupled from the input shaft of the system.

2. The system as claimed in claim 1, wherein
    the first coupling member of the clutch device is arranged to selectively eliminate any internal degree of freedom of the epicyclic geartrain, and
    the second coupling member of the clutch device is arranged to couple the epicyclic geartrain and the input shaft of the system.

3. The system as claimed in claim 2, wherein the first coupling member of the clutch device is interposed between a planet carrier and the sun gear of the epicyclic geartrain.

4. The system as claimed in claim 2, wherein at least one of the first coupling member and the second coupling member of the clutch device is a clutch.

5. The system as claimed in claim 1, wherein a ratio between an inertia of the annulus gear and the inertia of the sun gear is greater than twenty.

6. The system as claimed in claim 1, further comprising:
    a brake configured to be applied to the annulus gear of the epicyclic geartrain.

7. The method as claimed in claim 1, wherein the rotary machine is a combustion engine and the compressor is a supercharging compressor positioned in an intake circuit of the combustion engine.

8. A method for driving at least one supercharging compressor positioned in an intake of a rotary combustion engine comprising:
    connecting an input shaft to a belt secured to the rotary combustion machine;
    connecting an output shaft to the at least one supercharging compressor;
    providing an epicyclic geartrain, with an annulus gear being in a form of a flywheel,
        connecting said annulus gear at least one of planet pinions with which said annulus gear meshes, and
        connecting a sun gear of which is notably connected to the output shaft of the system; and
    providing a clutch device comprising a first coupling member and a second coupling member, and
    modifying a configuration of the epicyclic geartrain between a first configuration and a second configuration, by
        coupling the epicyclic geartrain to the input shaft of the system in the first configuration, and
        simultaneously uncoupling the epicyclic geartrain, with obtaining no internal degree of freedom, from the input shaft of the system in the second configuration.

9. The method as claimed in claim 8, further comprising:
    coupling a planet carrier to the input shaft of the system in the first configuration, and
    coupling the planet carrier to the sun gear in the second configuration.

10. The method as claimed in claim 8, further comprising when a speed of the annulus gear is less than a predefined value, increasing a kinetic energy of the annulus gear by coupling a planet carrier to the input shaft of the system.

11. The method as claimed in claim 10, further comprising if the speed of the annulus gear is less than the predefined value, uncoupling the planet carrier to the sun gear.

12. The method as claimed in claim 8, further comprising when a speed of the annulus gear is greater than a threshold value, transferring a kinetic energy of the annulus gear to the at least one supercharging compressor by coupling a planet carrier to the sun gear and simultaneously uncoupling the planet carrier to the input shaft of the system.

13. The method as claimed in claim 8, further comprising when the rotary machine brakes, increasing a kinetic energy of the annulus gear by coupling a planet carrier to the input shaft of the system.

14. Method according to claim 8, further comprising if a speed of the rotary machine is less than a given value, immobilizing the annulus gear by using a brake.

15. The method as claimed in claim 8, wherein the modifying is implemented during a transient phase that follows on from a variation in torque setpoint of the rotary machine.

* * * * *